Feb. 20, 1923.
D. R. CAPES.
GEAR OR WHEEL PULLER.
FILED MAY 31, 1921.
1,445,749.
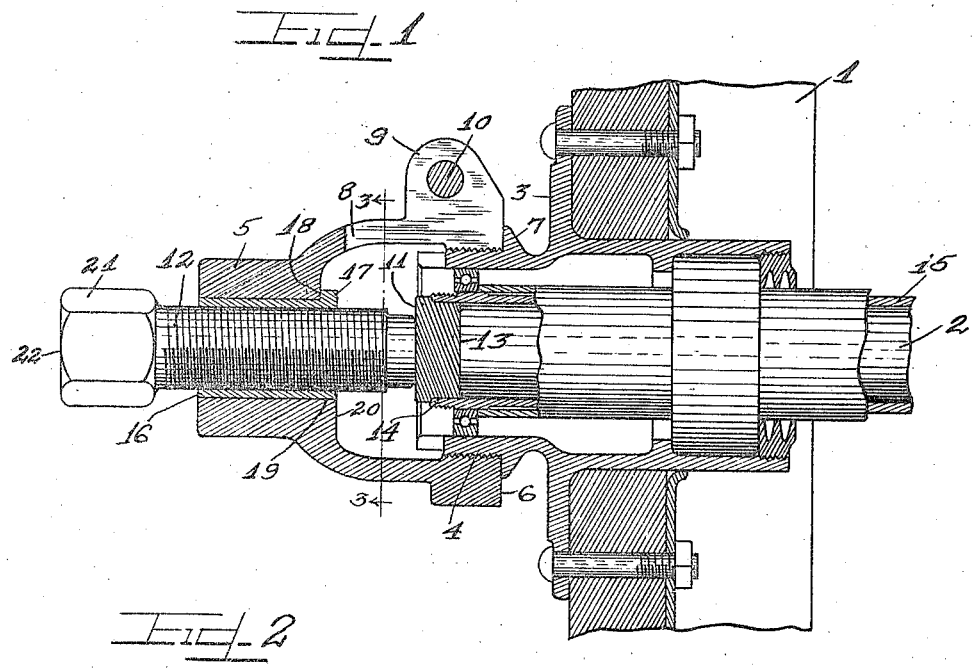
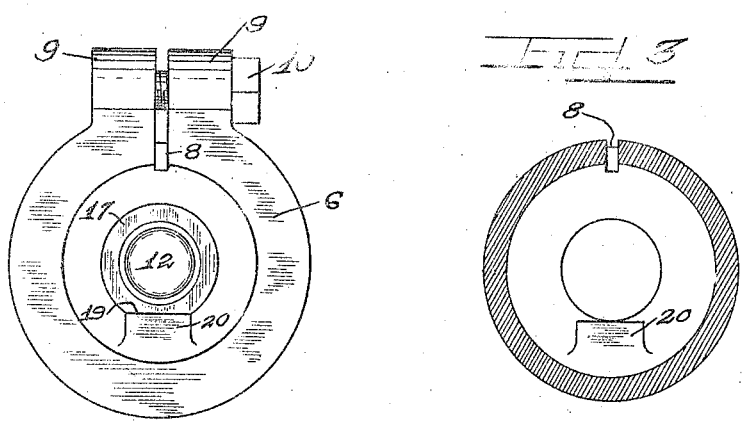

Patented Feb. 20, 1923.

1,445,749

UNITED STATES PATENT OFFICE.

DELBERT R. CAPES, OF CHICAGO, ILLINOIS.

GEAR OR WHEEL PULLER.

Application filed May 31, 1921. Serial No. 473,583.

*To all whom it may concern:*

Be it known that I, DELBERT R. CAPES, a citizen of the United States, and a resident of the city of Chicago, in the county of Cook and State of Illinois, have invented certain new and useful Improvements in a Gear or Wheel Puller; and I do hereby declare that the following is a full, clear, and exact description of the same, reference being had to the accompanying drawings, and to the numerals of reference marked thereon, which form a part of this specification.

When it is necessary for repairs or any other purpose to separate a wheel from its axle, it sometimes occurs that difficulty is encountered because the two parts are stuck together. Tools have been devised for separating the parts. Such tools usually consist of a male member that presses against the axle and a female member that pulls upon the wheel. It is the habit of the workman using such tool to screw the male member as tightly as possible against the axle and then strike the tool with a sledge in order to jar the wheel and the axle. In this way the threads between the male and female members very quickly become battered and the usefulness of the tool is terminated or lessened.

It is an object of this invention to devise a tool of this class which will avoid this difficulty.

It is a further object of this invention to devise a gear or wheel puller that shall have between its external and internal members a sleeve threaded upon one and slidable upon the other member, so that when the tool is struck to jar the wheel and axle the shock of the blow shall produce a sliding action between the sleeve and its housing instead of producing a strain upon the threads.

Other and further important objects of this invention will be apparent from the disclosures in the drawing and specification.

The invention (in a preferred form) is illustrated in the drawings and hereinafter more fully described.

Fig. 1 is a sectional view through a part of a wheel showing the application of my wheel puller, partly in section.

Fig. 2 is a front elevation of the wheel puller in detached position.

Fig. 3 is a section on the line 3—3 of Fig. 1.

On the drawings:

The wheel 1 and its axle 2 are of a type frequently found in automobiles. In order to separate the wheel 1 from the axle 2 it is necessary that the wheel and the parts of the bearing connected therewith shall be moved to the left while the axle 2 remains stationary. The hub 3 of the wheel is provided with the usual threads 4, which are ordinarily employed to hold the cap covering the end of the bearing. In the form of my invention which I have chosen for illustration, the outer member of the tool is secured to the wheel by being screwed upon these threads, but the invention is not limited to a tool provided with such threads and it may be used in connection with other types of wheel than that illustrated.

The outer member of my tool is in the form of a hollow bearing neck as shown at 5 and is preferably bell-shaped. The mouth of the bell is provided with threads which fit the threads 4. The edge 6 of the mouth affords a bearing surface which will abut against the shoulder 7 upon the hub and limit the extent to which the outer portion can be screwed upon the wheel. In order that the threads may fit easily, the bell is split as shown at 8. The rim of the bell is provided with two lugs 9 and a bolt 10 is threaded in one of these lugs and passes loosely through the other in order that it may draw the lugs together. When the outer member has been screwed upon the threads 4 until the rim 6 abuts against the shoulder 7, the bolt 10 is tightened in order that the threads may grip one another fast and relative motion between the outer member and the hub will be effectually prevented. The inner member is not secured to the axle but bears against it in order that it may exert a thrust thereon.

In the application of the tool illustrated, the shaft or axle 2 does not extend beyond the outer edge of the sleeve 15 which surrounds it and must move with it. Said sleeve, as well as the axle, should receive the thrust. To adapt the tool to this situation, a filler block 11 is provided, against the outer face of which the screw 12, which constitutes the inner member, abuts. The filler block has a face 13, which bears against the end of the shaft 2, and a shoulder 14 which bears against the outer edge of the sleeve 15.

Thus a thrust received by the screw 12 is transmitted alike to the sleeve 15 and the axle 2.

Threaded upon the screw 12 is a sleeve 16 which fits easily in the central part of the outer member 5. The inner end of this sleeve has a flange 17 which bears against the shoulder 18 formed by the interior surface of the bell. At one point, as shown at 19, the flange is cut away to afford a flat surface which cooperates with a flat surface on a lug 20 on the inside of the bell to prevent the sleeve 16 from rotating. The outer end of the screw 12 has a head 21 furnished with the usual lateral faces for the application of a wrench. The top 22 of this head is available to receive the blows of a hammer.

In the operation of this tool when a wheel is to be removed from its axle the outer member 5 is first screwed upon the hub by means of the threads 4. When it has been screwed completely home the bolt 10 is tightened until all further possibility of relative motion between the member 5 and the hub 3 is prevented. A wrench is then applied to the head 21 and the screw 12 is turned until it bears against the end of the shaft 2 or the outer surface of the block 11. Any further application of the wrench to the head 21 will result in pressure of the screw 12 against the shaft 2 or against the block 11 and also in pressure of the flange 17 against the shoulder 18. If the wheel is not stuck to the axle, the turning of the head 21 under these conditions will pull the wheel 1 toward the right in Figure 1 and effect a separation of the wheel and axle. If the wheel is stuck on the axle, such a turning of the head 21 will only tighten the parts increasing the bearing of the screw 12 against the surface of the shaft 2 or block 11 and the pressure of the flange 17 against the shoulder 18. The latter thrust is transmitted in the form of a pull against the hub.

When the head 21 has been turned until these forces are as large as the workman thinks they may safely be made and the wheel has not started to pull away from the axle, he strikes the surface 22 with a hammer. The jar of this blow is communicated to the shaft 2 by being transmitted through the length of the screw 12, but there is no strain induced thereby between the threads of the screw and the interior threads of the sleeve 16 because any motion of the screw is accompanied readily by a motion of the sleeve as the sleeve is slidable in the outer member 5. The outer member 5 and the wheel do not receive directly any motion from this blow, but their inertia tends to cause the sticking surfaces to separate when the jar from the blow is communicated to the axle 2.

If the adhesion between the sticking surfaces is too great for them to separate under the effect of this blow, no bruising of the threads 4 will result because these threads have been tightened upon the hub 3 until all relative motion between the parts 5 and 3 is impossible. These threads will not be strained for the additional reason that the freedom of the sleeve 16 to slide in the part 5 prevents any force of the blow from coming directly to these threads. It can reach them only by being transmitted through the axle, through whatever makes the axle stick to the wheel, and then through the wheel. The inertia of the wheel is large compared to the inertia of the part 5. Consequently no great strain can be put on the threads 4. The separation of the tool into two parts, one of which receives the thrust directly and the other only through the sticking surfaces greatly increases the effect of the blow because no tendency of the blow to move the wheel toward the right in Figure 1 is directly transmitted.

It will be evident that the application of this invention is not limited to the particular form of wheel illustrated with the threaded hub. When it is applied to other wheels, as for example in removing a gear wheel from its shaft, other fastening means may be used instead of the threads 4. As such fastening means are already known to workers in this art. I do not illustrate or describe them. The tool is equally applicable to the removal of a casting from a mandrel or to any other situation in which a part surrounding a shaft or an axle is likely to require considerable force for its removal.

I am aware that numerous details of construction may be varied through a wide range without departing from the principles of this invention, and I therefore do not purpose limiting the patent granted otherwise than necessitated by the prior art.

I claim as my invention:

A wheel puller comprising a bell-shaped member having an internally threaded mouth and an outer hollow bearing neck, a sleeve slidably mounted in said neck and extending therethrough, the inner end of said sleeve having a radial flange bearing against the inner surface of said bearing neck, said flange and bearing neck having cooperating flat portions for preventing relative rotation thereof, and a jack screw extending through said sleeve and in screw-threaded engagement therewith.

In testimony whereof I have hereunto subscribed my name in the presence of two subscribing witnesses.

DELBERT R. CAPES.

Witnesses:
 EARL M. HARDINE.
 JAMES M. O'BRIEN.